United States Patent [19]

Hanagata et al.

[11] 4,340,848

[45] Jul. 20, 1982

[54] APPARATUS FOR CONTROLLING THE PULSE PERIOD OF PULSES APPLIED TO A PULSE MOTOR

[75] Inventors: Takayoshi Hanagata; Atsushi Noda, both of Yokohama, Japan

[73] Assignee: Canon Kabushiki Kaisha, Tokyo, Japan

[21] Appl. No.: 180,094

[22] Filed: Aug. 21, 1980

[30] Foreign Application Priority Data

Aug. 31, 1979 [JP] Japan ............................... 54/111275

[51] Int. Cl.³ ............................................. G05B 13/00
[52] U.S. Cl. .................................. 318/561; 318/601; 318/603; 318/696; 318/685
[58] Field of Search ............... 318/603, 601, 696, 685, 318/341, 561

[56] References Cited

U.S. PATENT DOCUMENTS 3,813,592 5/1974 Ryberg ................................. 318/696
4,025,837 5/1977 Meier et al. ......................... 318/561
4,152,631 5/1979 Weinberg et al. .................. 318/341

Primary Examiner—Gene Z. Rubinson
Assistant Examiner—Eugene S. Indyk
Attorney, Agent, or Firm—Fitzpatrick, Cella, Harper & Scinto

[57] ABSTRACT

Apparatus for controlling the pulse period of pulses applied to a pulse motor in a printer is disclosed. The pulse motor is accelerated by gradually reducing the pulse period of pulses applied to the pulse motor. After the detection of return of the printing head to a certain predetermined position, the speed of pulse motor is gradually decreased down by gradually extending the pulse period of pulses applied to the motor. At the start of returning movement of the printing head, the first pulse of pulses applied to the motor has a pulse period larger than that of self-start pulse of the motor. The pulse period of the subsequent pulses is gradually reduced. At the time of stopping the pulse motor, the pulse period of pulses applied to the motor is gradually extended to decrease the speed of the pulse motor. At the moment when the pulse period is extended to a value larger than the pulse period of self-start pulse of the motor, application of pulse to the pulse motor is stopped.

9 Claims, 6 Drawing Figures

APPARATUS FOR CONTROLLING THE PULSE PERIOD OF PULSES APPLIED TO A PULSE MOTOR

BACKGROUND OF THE INVENTION

1. Field of the Invention

The present invention relates to apparatus for controlling the pulse period of pulses applied to a pulse motor. More particularly, the invention relates to apparatus for driving a pulse motor used in a printer of the type in which the printing head is moved by a pulse motor in the direction across a printing paper to effect printing.

2. Description of the Prior Art

In a wire printer or a thermal printer, the printing head is moved in the direction across a printing paper to effect printing. To make it possible to carry out intermittent printing with such type of printer there is often used a pulse motor as means for driving the printing head. This is because the use of pulse motor brings forth the following advantages:

(1) Since it is driven in response to a pulse signal, instantaneous start and instantaneous stop are possible.

(2) At start and stop there is generated no noise.

(3) It has a long useful life and high reliability.

In the case of a DC motor or AC motor, the rotational speed of the motor gradually increases up and it can reaches a constant speed only after a transition stage of rotation. On the contrary, a pulse motor can start rotating at a uniform rotational speed at once when the first pulse is applied to the motor. There is no transition stage or, if any, it is extremely short. This is another advantage of pulse motor. However, the use of a pulse motor in a printer involves some problems. There is a limitation regarding the first pulse applied to the pulse motor. Because of the inertia force on the rotor and driving mechanism, the pulse period of the first pulse can be reduced only to a certain limit value. This is disadvantageous to high speed driving of printing head. In a printer, it is often required to drive the printing head at a higher speed. For example, this is applied to the case of carriage return. In this case, according to the prior art, the necessary high speed driving is attained by reducing the pulse period of the second and subsequent pulses relative to the pulse period of the first pulse. This prior art technique will be described in detail hereinafter with reference to FIG. 1.

FIG. 1 shows characteristic curves of a common pulse motor generally used in printers.

Curve 1 is a torque/frequency relation curve for self-start and curve 2 is a torque frequency for continuous response. From FIG. 1, it will be understood that when 50 g.cm torque is required to drive a carriage, the pulse motor should be started with the frequency of 500 pps (pulse period: 2 millisecond) which is indicated by the intersection 6 with the curve 1. However, if the pulse motor is continuously driven with the frequency of 500 pps, then it operates in a mode of continuous response and therefore the relation between torque and frequency thereof is shifted from curve 1 to curve 2. As seen from curve 2, in this case, there is produced about 115 g.cm of torque which is more than sufficient for this purpose. Therefore, instead of keeping the frequency at 500 pps, the frequency is gradually increased up from 500 pps to 1000 pps (pulse period: 1 m.s.) and then it is kept constant at 1000 pps. By doing so, the relation between torque and frequency is shifted from the intersection 6 on curve 1 to the point 7 at which curve 2 and 1000 pps line intersect. Thus, it will be understood that the motor speed can be increased up to a value two times larger than at the start time while obtaining the constant torque of 50 g.cm. In summary, FIG. 1 indicates that 600 pps is the maximum self-start frequency of the pulse motor and with any frequency larger than 600 pps the pulse motor can not start, and that by gradually increasing the frequency starting with 500 pps it is made possible to drive the pulse motor at a higher speed up to 1000 pps while obtaining the constant output of 50 g.cm at the same time.

In accordance with the above teachings, the pulse motor used in the printer of the prior art has been driven to attain a rapid carriage return. That is, to drive the printing head at a higher speed, the pulse motor is started with the first pulse having a pulse period larger than the determined value and then the pulse period of pulses subsequent to the first pulse is gradually reduced. However, it has been found that this prior art technique has the following problems:

(1) The pulse period is controlled in such manner that the first pulse has a pulse period of 2 m.s. and after reaching the constant speed, pulses have a pulse period of 1 m.s. In this case, it is required to reduce the pulse period to that of the constant pulse stepwise through at least several pulses.

(2) Overrun of carriage often occurs when the carriage running at a high speed is stopped by an abrupt stoppage of pulse. To prevent such trouble, a stopper has been provided conventionally in a printer. However, noise is generated by impact of the carriage against the stopper. In the worst case, the carriage is damaged.

SUMMARY OF THE INVENTION

Accordingly, it is an object of the invention to provide a pulse motor driving apparatus which enables one to accurately control the speed of a pulse motor not only at the time of low speed operation but also at the time of speed reduction.

It is another object of the invention to provide a pulse motor driving apparatus which enables one to stop the carriage smoothly at the end of carriage return by a pulse motor.

It is a further object of the invention to provide in a printer a pulse motor driving apparatus which eliminates the troubles of noise generation and damages which otherwise may be caused by impact of the printer carriage against a stopper.

Other and further objects, features and advantages of the invention will appear more fully from the following description taken in connection with the accompanying drawings.

DESCRIPTION OF PREFERRED EMBODIMENTS

A preferred embodiment of the present invention is described with reference to FIGS. 2 through 5.

Figure 1:
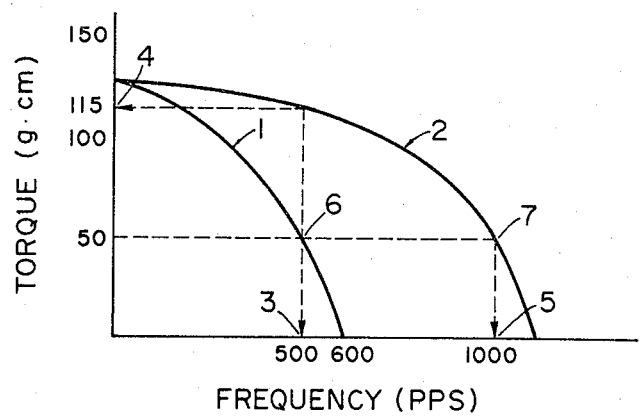
FIG. 1 shows characteristic curves of a common pulse motor used in a printer according to the invention.
Figure 2:
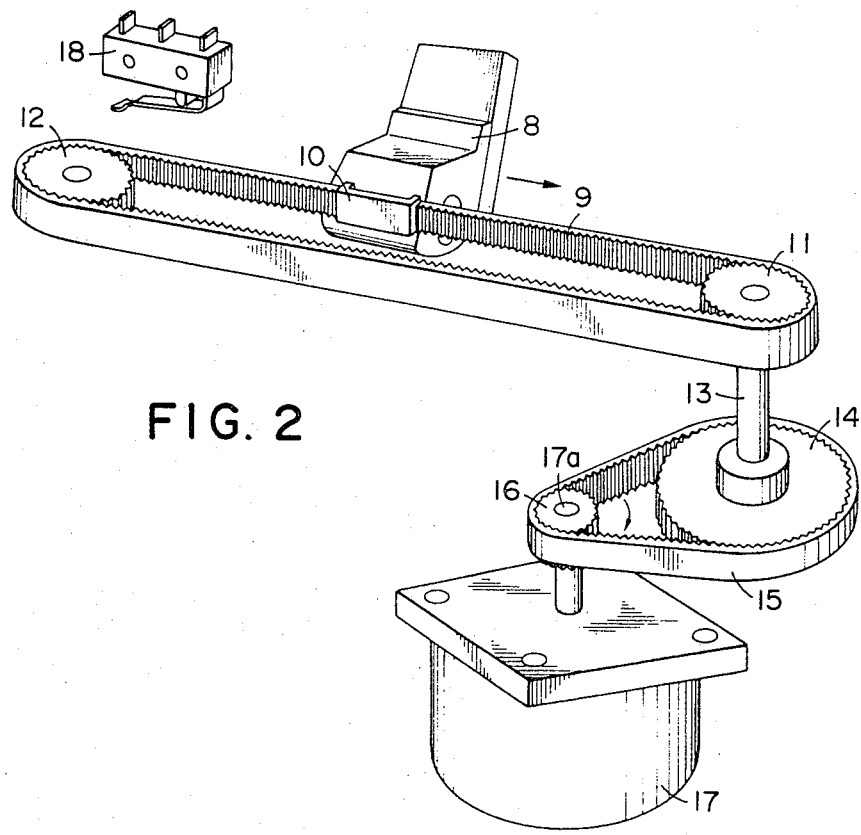
FIG. 2 is a schematic perspective view of the carriage driving part of a printer according to the invention.
Figure 3:
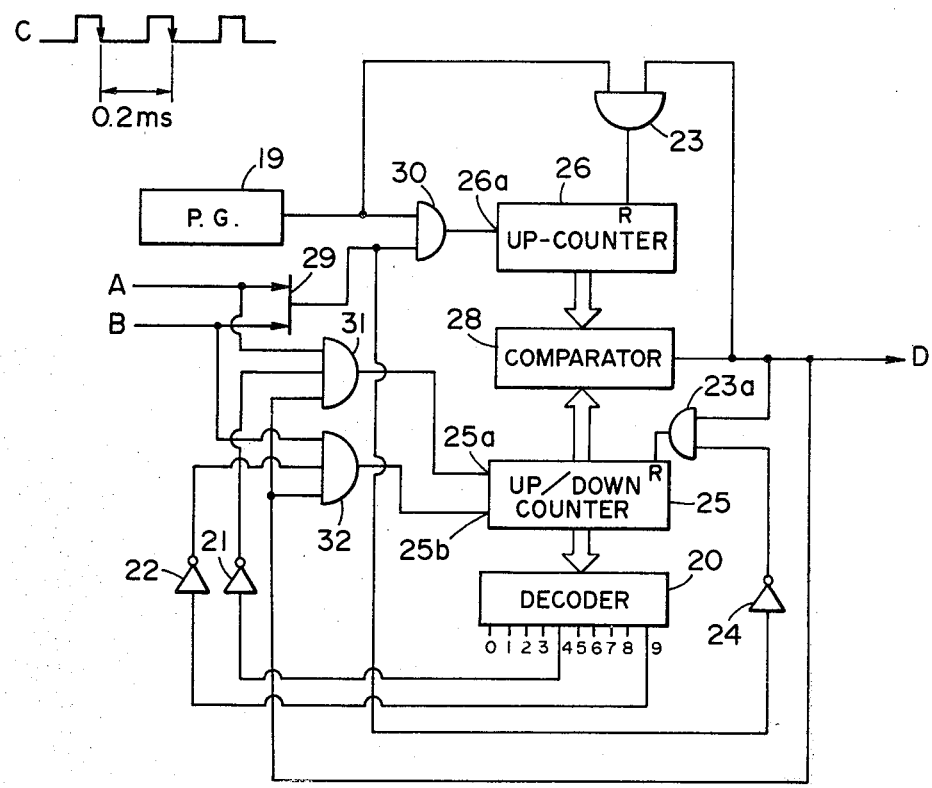
FIG. 3(a) shows the waveforms of outputs from the pulse generator of FIG. 2.
FIG. 3(b) is a circuit diagram of a pulse generator for generating pulses whose pulse period is stepwise increased and decreased in accordance with the principle of the invention.

As shown in FIG. 2, a carriage 8 carrying thereon a printing head in a manner known per se is fixed to an endless belt 9 with a metal fixture 10. The endless belt 9 extends around pulleys 11 and 12. The pulley 11 is integrally connected with a pulley 14 through a shaft 13. Designated by 17 is a pulse motor the output shaft 17a of which is integrally connected with a pulley 16. A belt 15 extends around the pulleys 14 and 16 so that the torque can be transmitted from the pulleys 16 to 14. Therefore, as the pulse motor 17 is driven to rotate the output shaft 17a clockwise, the carriage 8 is moved in the direction of the arrow shown in FIG. 2 through pulleys 16, 14 and 11. In this manner, the carriage 8 moves in response to pulse signal in the direction across a printing paper (not shown) disposed facing the printing head. The printing head may be of any type. In case of a thermal printer, for example, the printing head will comprise a plural number of heating resistants arranged thereon. When a print signal is applied to the head, a certain determined one of the resistants generates heat to effect printing on a heat sensitive paper. In response to the above carriage driving pulse signal subsequent to the print signal, the carriage carrying the printing head moves for the next printing. In this manner, printing is carried out continuously in every one line.

When the carriage reaches the right hand end of its moving path is viewed on the drawing of FIG. 2, a control signal is issued which reverses the moving direction of the carriage. Now, the carriage is moved leftward for carriage return. In this course carriage return, a microswitch 18 serving as detection means detects the carriage when it reaches a predetermined position in its returning course. Turn-on of the microswitch 18 constitutes a detection signal. The microswitch 18 is so preset that the carriage overruns the detection point a short distance after turn-on of the microswitch and then stops. After returning back to the home position, the carriage 8 moves again in the direction across the printing paper in response to the next pulse signal in the same manner as above. This procedure is repeated line by line in manner of intermittent printing.

At the beginning of carriage return, the speed of the carriage 8 is stepwise increased up from low to high and after the completion of one carriage return the carriage speed is decreased down from high to low. To control the carriage speed in this manner there is used a pulse generator circuit as shown in FIG. 3(b) which can generate pulses whose pulse period is stepwise increased up and decreased down.

In the pulse generating circuit shown in FIG. 3(b), the pulse generator designated by 19 is a pulse generating source comprising a quartz oscillator or the like. In this embodiment, as shown in FIG. 3(a), the pulse generator generates periodic pulses of 0.2 m.s. which are applied to AND gate 30. At the other input terminal, AND gate 30 receives the output from OR gate 29 which takes up the logical sum of inputs A and B. The input A becomes high level when the pulse motor is started and the other input B becomes high level when it is slowed down. In other words, the circuit is designed in such manner that Off of the microswitch at the start time gives signal "1" to the input A and "0" to B and On of the microswitch at the time of speed down gives the inverted signals to A and B respectively. During the time of the pulse motor being at a stop, the inputs A and B are both at low level. Whenever a high level signal appears at either of the inputs A and B, the pulses generated from the pulse generator 19 and introduced into an up-counter 26 through AND gate 30 to count the pulses. Inputs A and B are applied to the first inputs of AND gates 31 and 32 respectively.

The circuit shown in FIG. 3(b) includes further an up/down counter 25 formed as a ring counter which receives subtraction inputs 25a from AND gate 31 and addition inputs 25b from AND gate 32. When the up/down counter receives a subtraction input, a subtraction is made from the counter content for every pulse. On the contrary, when it receives the addition input, an increment is added to the counter content for every pulse. The output from the ring counter 25 is decoded by a decoder 20 and its fourth and ninth outputs (signal "1" is issued when the content of counter 25 becomes 4 and 9) are applied to the second inputs of AND gates 31 and 32 through inverters 21 and 22 respectively. The output of the ring counter 25 is also introduced into a comparator 28 which compares the output with the output from the up-counter 26. When the two outputs exactly correspond to each other, a signal appears at the output D of the comparator 28. This output D is applied to AND gates 23 and 23a and also to the third inputs of AND gates 31 and 32. Outputs from AND gates 23 and 23a are applied to reset inputs of counters 26 and 25 respectively. The decimal up-counter 26 is reset by the first pulse issued out from the pulse generator when an output comes out from the comparator 28. The decimal up/down ring counter 25 is reset when an output signal comes out from the comparator 28 and neither input A nor B has a signal.

With the above circuit the pulse motor is started from its reset position, gradually speeded up, gradually slowed down before stop in its returning course to the home position and then stopped at the home position in the following manner:

When the pulse motor is in reset, inputs A and B are both "0" (low level) and therefore the output of OR gate 29 is "0" and that of the inverter 24 is "1" (high level). Also, provided that the counters 25 and 26 have initially the same content, then the output is "1" and therefore the ring counter 25 is reset to "0" through AND gate 23a. On the other hand, the other decimal counter 26 is also reset by a pulse from the pulse generator 19 through AND gate 23 its content becomes "0".

When the pulse motor is started and the input A is turned to "1", then the output of OR gate 29 becomes "1" and therefore AND gate 30 is opened. Output from the pulse generator 19 is allowed to enter the input terminal 26a of the counter 26. Thus, the counter 26 gets ready for counting up. However, since the content of the counter 26 changes in synchronism with fall of input signal, the counter 26 holds its content of "0" until fall time of the output of pulse generator 19 (hereinafter the output is referred to as output C). During this period, the inputs of AND gate 31 are all "1" (no signal appears at the fourth terminal of decoder 20 and the output of inverter 21 is "1"). Therefore, the counter 25 has "1" at its subtraction input 25a. When the output C becomes "0", namely when the pulse falls down, the counter 26 counts one pulse and its content becomes "1". Therefore, the output of comparator 28 becomes "0" and the output of AND gate 31 falls down to "0". Since this signal enters the subtraction input 25a of ring counter 25, the content of the counter 25 becomes "9" by subtracting one from the content. Falling of the next output C makes the content of the counter 26 change to "2". But, the content of the ring counter 25 remains unchanged. In the same manner, the counter 26 continues counting up the pulses by receiving the outputs C until the content reaches "9". When the content of the counter 26 becomes "9", the output of comparator 28 becomes "1". Therefore, the output of AND gate 23 becomes "1" with the rising of the next output C and the counter 26 is reset to "0". At this time point, the output of comparator 28 falls down to "0" and also the output of AND gate 31 falls down. As a result, one is subtracted from the content of the ring counter 25 which is, therefore, reduced to "8".

In this manner, an output (D) is issued from the comparator 28 after the time from rise-up of the first pulse to fall-down of 10th pulse has been passed, namely 0.2×10=2 m.s. after the first rising of pulse. While the counter 26 restarts counting up again from "0", the content of ring counter 25 is still "8" at this time. Therefore, the next output (D) is issued from the comparator 28 at 0.2×9=1.8 m.s. after the first one. The apparatus continues operating similarly so that the pulse interval of outputs D is shortened at a rate of 0.2 m.s. per output D until the content of ring counter 25 reaches "4". When the content of ring counter 25 becomes "4", namely when the output "4" of the decoder 20 turns to "1", then the output of inverter 21 becomes "0" and the output of AND gate 31 remains always "0" which makes the ring counter 25 keeping its content "4". In this position, the comparator 28 has one output at every five outputs C. Thus, the pulse period of output D becomes constant which is 0.2×5=1.0 m.s.

In the manner described above, the speed at which the carriage 8 is moved back toward the home position is stepwise increased up and then made constant at a high speed level. At this uniform high speed the carriage returning back to the home position enters the area of microswitch 18. When the microswitch 18 detects it and turns On, the output A (start) becomes "0" and the output B (speed down) becomes "1". Thereby AND gate 32 is opened and the output D is introduced into the addition input terminal 25b of ring counter 25. Now, the ring counter 25 has an increment of "1" in its content every falldown of output "D". With the increase of the counter content, the pulse period is stepwise extended by 0.2 m.s. every time. When the content of ring counter 25 is increased up to "9", an output is issued from the terminal "9" of decoder 20 and the output of inverter 22 is turned to "0". Therefore, the ring counter 25 holds its content "9" and the pulse period is kept constant at the value of 2.0 m.s.

FIGS. 4(a), (b) and (c) show the waveforms of output D, input A and input B respectively. As seen from the timing chart, when the input A is "1", the output D automatically increases the speed from 2.0 to 1.0 m.s. and then keeps the speed constant at 1.0 m.s.. On the contrary, when the input B is "1", the output D automatically decreases the speed down to 2.0 m.s.. When the pulse period reaches the predetermined value in this manner, it is detected and application of pulse to the pulse motor is stopped to stop the carriage in good timing.

Figure 5:
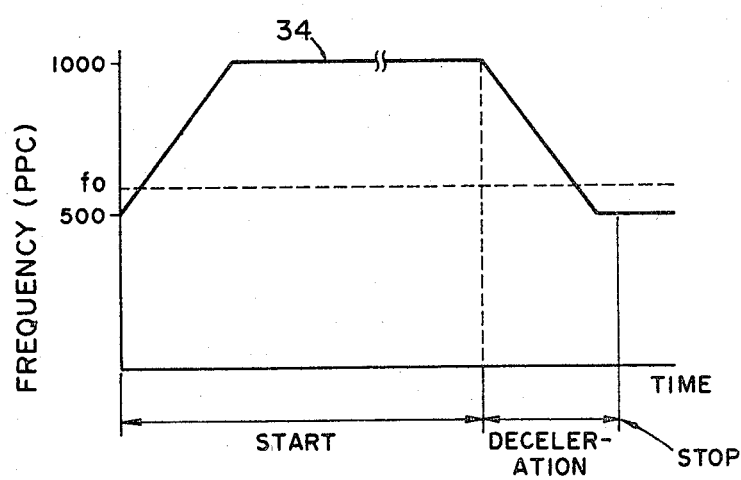
FIG. 5 is a graph showing the relation between frequency and pulse number in connection with FIGS. 4(a)-(c).

FIG. 5 is a graph showing the relation between pulse number and frequency. It is seen from curve 34 that at the beginning of motor start the level of frequency is lower than the maximum self-start frequency $f_0$ (namely the pulse period is larger than the maximum self-start pulse period) and the frequency is increased up gradually to a constant level beyond $f_0$. In the speed reduction area, the frequency is gradually decreased down. Immediately before the stop point, the frequency is again at a level lower than $f_0$.

Figure 4:
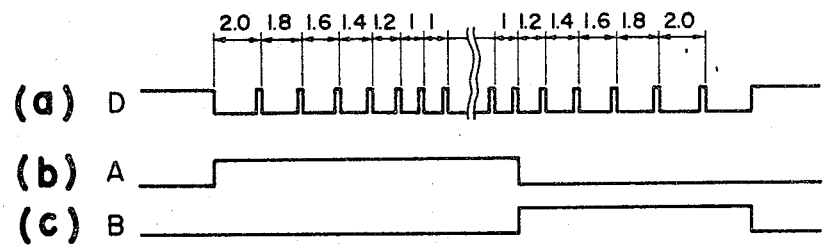
FIGS. 4(a)-(c) are timing charts of pulses obtainable from the circuit shown in FIG. 3.

While FIGS. 4 and 5 have shown the case in which the pulse motor is stopped immediately after the issuance of a pulse whose period has just been reduced to 2.0 m.s. However, the carriage may be stopped at another time point somewhat later than that. After the pulse period has once been reduced to 2.0 m.s., the pulse period is kept constant at 2.0 m.s. for the subsequent pulses. Therefore, the pulse motor may be stopped after several pulses having such constant pulse period have been generated and by detecting it.

As readily understood from the foregoing, the pulse motor driving system according to the present invention described above has may advantages over the prior art, which may be summarized as follows:

(1) To obtain driving pulses whose pulse period is stepwise increased up and decreased down there are used very simple two inputs derived from On-Off of a circuit (switch) for detecting the return position of a printing head. Therefore, the pulse period can be increased and decreased in a stable and reliable manner. This makes it possible to increase up and decrease down the moving speed of printing head with high stability and reliability.

(2) By employing a highly stable pulse generator there are obtained highly stable and less variable pulses the pulse period of which stepwise increases and decreases precisely.

(3) Since the pulse frequency occurring immediately before the pulse motor being stopped is at a level lower than the maximum self-start frequency, a stable and accurate stop of the pulse motor is assured.

Obviously many modifications and variations of the present invention are possible in the light of the above teachings. The scope of the invention, therefore, is to be determined solely by the following claims.

What we claim is:

1. Apparatus for controlling the pulse period of pulses applied to a pulse motor, comprising:
means for generating addition and subtraction instruction signals;
means for generating pulse signals at constant periods;
first counting means for counting the number of pulses from said pulse generating means;
second counting means for carrying out counting up and down is accordance with said addition and subtraction instruction signals;
means for comparing the output of said first counting means with that of said second counting means to produce a coincidence signal;
means for applying an addition input to said second counting means upon the coincidence of said addition instruction signal, a preselected output of said second counting means and a coincidence signal from said comparing means, and for applying a subtraction input to said second counting means upon the coincidence of said subtraction instruction signal, a preselected output of said second counting means and a coincidence signal from said comparing means; and a pulse motor connected to receive the coincidence signals from said comparing means.

2. Apparatus according to claim 1 which further comprises a moving body driven by said pulse motor and means for switching said subtraction instruction signal to said addition instruction signal by detecting that said moving body has reached a predetermined position.

3. Apparatus according to claim 2, wherein said moving body has printing head for effecting printing on a recording paper.

4. Apparatus for controlling the pulse period of pulses applied to a pulse motor, comprising:

means for generating addition and substraction instruction signals;

means for generating pulse signals at constant periods;

first gate means for passing pulse signals generated from said pulse generating means in accordance with either of said addition or substraction instruction signals;

first counting means for counting the number of pulse signals from said first gate means;

second counting means for counting up and down in accordance with said addition and subtraction instruction signals;

means for comparing the output of said first counting means with that of said second counting means to produce a coincidence signal;

second gate means for applying the coincidence signal from said comparing means to said second counting means for counting up in accordance with one of said addition and subtraction instruction signals and for counting down in accordance with the other of said addition and subtraction instruction signals; and a pulse motor for receiving the coincidence signal from said comparing means.

5. Apparatus according to claim 4 which further comprises a decoder for decoding the count value counted by said second counting means to apply a specific decode output to said second gate means.

6. Apparatus according to claim 5, wherein said decoder is capable of holding the output of said addition instruction signal or said subtraction instruction signal applied to said second gate means.

7. Apparatus for controlling pulse period of pulses applied to a pulse motor, comprising;

means for generating addition and subtraction instruction signals;

means for generating pulse signals at constant periods;

first gate means for passing pulse signals generated from said pulse generating means in accordance with either of said addition or substraction instruction signals;

first counting means for counting the number of pulse signals from said first gate means;

second counting means for counting up and down in accordance with said addition and subtraction instruction signals;

means for comparing the output of said first counting means with that of said second counting means to produce a coincidence signal;

second gate means for applying an addition input to said second counting means upon the coincidence of said addition instruction signal, a decode output from said decoder and a coincidence signal from said comparing means and for applying a subtraction input to said second counting means upon the coincidence of said subtraction instruction signal, a decode output from said decoder and a coincidence signal from said comparing means;

a pulse motor for receiving the coincidence signal from said comparing means;

a moving body driven by said pulse motor; and means for switching said subtraction instruction signal to said addition instruction signal by detecting that said moving body has reached a predetermined position to issue instruction to said first gate means and said second gate means.

8. Apparatus according to claim 7, wherein said moving body has a printing head for effecting printing on a recording paper.

9. Apparatus according to claim 7, wherein said decoder is capable of holding the output of said addition instruction signal and said subtraction instruction signal applied to said second gate means.

* * * * *

UNITED STATES PATENT AND TRADEMARK OFFICE
CERTIFICATE OF CORRECTION

PATENT NO.   :   4,340,848
DATED        :   July 20, 1982
INVENTOR(S)  :   Hanagata, et al.

It is certified that error appears in the above-identified patent and that said Letters Patent is hereby corrected as shown below:

Column 2, line 31, "pulse" to read -- pulses --;

Column 4, line 11, "and" to read -- are --;

line 20, "the" to read -- a --;

Column 8, line 19, after "signals;", insert the following sentence:

-- a decoder means for decoding the count value counted by said second counting means; --.

Signed and Sealed this

Fourth Day of January 1983

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,340,848

DATED : July 20, 1982

INVENTOR(S) : Hanagata, et al.

It is certified that error appears in the above-identified patent and that said Letters Patent is hereby corrected as shown below:

Column 5, line 19, "one" to read -- 1 --.

Signed and Sealed this

Twenty-ninth Day of March 1983

[SEAL]

Attest:

GERALD J. MOSSINGHOFF

Attesting Officer

Commissioner of Patents and Trademarks